May 3, 1932.  H. M. WILLIAMS ET AL  1,856,680
DYNAMO BRUSH
Filed Dec. 2, 1925
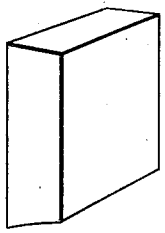
SINTERED MIXTURE OF GRAPHITE
AND A BINDER OF CONDENSATION
PRODUCT OF PHENOL AND FURFURAL
Inventors
Harry M. Williams
and Alfred L. Boegehold
By Spencer Sewall & Hardman
their Attorneys.

Patented May 3, 1932

1,856,680

UNITED STATES PATENT OFFICE

HARRY M. WILLIAMS, OF DAYTON, OHIO, AND ALFRED L. BOEGEHOLD, OF DETROIT, MICHIGAN, ASSIGNORS TO GENERAL MOTORS RESEARCH CORPORATION, OF DETROIT, MICHIGAN, A CORPORATION OF DELAWARE

DYNAMO BRUSH

Application filed December 2, 1925. Serial No. 72,807.

This invention relates to brushes for dynamo-electric machines, and one of the objects of the invention is to improve the manufacture of brushes in order to secure, economically, a product which will be uniform in durability and electrical characteristics.

It has been found that the lack of uniformity of brushes is due to variations in the properties of the raw materials from which the brushes are manufactured. For example, brushes have been made from particles of carbon bound together with other forms of carbonaceous material. The carbon particles are provided from various forms of natural products, such as graphite, lamp black and petroleum coke. The carbonaceous binder has been formed from coal tar, petroleum pitch, resins, starch, molasses, and the like, all capable of being converted into carbon during the manufacture of the brush. Various mixtures of carbon particles and particles of binding materials have been briquetted into the size desired for brushes, and the briquettes are sintered in a non-oxidizing atmosphere,—sometimes at a temperature sufficiently high to convert the carbonaceous matters into graphite. Dynamo brushes generally require a small percentage of abrasive material which is uniformly distributed throughout the brush in order that the commutator will be kept clean, but will not be unduly worn. Sometimes the natural carbon used in the manufacture of the brush contains sufficient abrasive material for this purpose. Where present in insufficient quantities, this material must be added. It is apparent that such brush materials may vary greatly in their physical and electrical properties, with the result that there will be a wide variation in brushes made during a substantial period of production.

In order to secure uniformity, the present invention provides a method of manufacturing brushes from ingredients which have a relatively high standard of uniformity. Artificial and synthetic substances are preferred since they may be made by processes which can be carried out with a high degree of uniformity. For example, the graphite content is provided by a form of artificial graphite which is known to the trade as "Acheson #2301". The graphite should be fine enough to pass a 250-mesh screen. The carbonaceous binding material is preferably synthetic resin. Phenolic condensation products, such as "bakelite" and "durite" are satisfactory.

The present invention is directed more particularly to the manufacture of a brush from graphite and durite. "Durite" is the trade-name for a synthetic resin which is the condensation product of phenol and furfural, described in the patent to Novotny #1,398,146, issued November 22, 1921.

The figure of the drawing is a perspective view of a dynamo brush constructed in accordance with the present invention.

Quantities of durite and graphite are mixed in a pot-ball mixer for about three hours. The formula will vary according to the use for which the brush is intended. Satisfactory brushes have been made from mixtures in which the durite content varies from approximately 5% to 15% by weight of the total mixture. The mixture is briquetted at a pressure depending upon the size of the briquette. For a one-inch cubical briquette, the briquetting pressure should be approximately 20,000 lbs. per sq. in., and the temperature of the briquette dies should be between 350° and 400° F. The heat and pressure is applied for about ten minutes. The product is a briquette composed of uniformly distributed graphite particles which are bound together by durite which has been rendered insoluble and infusible by the application of heat and pressure. The briquette may be used as a brush without further treatment, but its resistance will be relatively high.

If brushes of relatively low resistance are desired, the briquettes are packed in charcoal in sealed iron boxes which are heated at a temperature and for a time sufficient to sinter or coke substantially all of the durite. The time and temperature will depend upon the size of the briquettes. Experiments with one-inch cubes showed that satisfactory results are obtained if the sintering temperature is at least 1750° F., and the sintering time is at least 16 hours. The time and temperature may be varied, depending upon the size of the briquette. Smaller briquettes may require less time and lower temperature to coke the binder. However, if relatively low resistance is desired, substantially all of the durite should be coked. It will be noted, however, that the strength of a brush composed of graphite and durite does not depend on sintering. It has been found that the strength of the non-sintered briquette is at least equal to the strength of the sintered briquette.

The hardness of the brushes may be increased by increasing the proportion of durite. The conductivity of a sintered briquette is increased by increasing the quantity of durite, thus showing that sintered durite is a good electrical conductor. For example, a brush made from a sintered mixture of 88% graphite and 12% durite has a resistance of .0004 ohms per cu. in.

A brush made by sintering a briquetting mixture of durite and graphite, does not require the addition of an abrasive substance, such as aluminum oxide, in order to keep the commutator clean. The durite coke contains an abrasive material which is uniformly distributed throughout the brush.

By following out this method, brushes may be made in large quantities with a high degree of uniformity. This is brought about first by securing, instead of natural ingredients, materials which are the product of chemical processes but can be controlled so as to secure products of great uniformity. When such ingredients are mixed, briquetted and sintered according to the present process, the resulting product is certain to be uniform, since each step of the process can be uniformly controlled.

While the form of embodiment of the present invention as herein disclosed, constitutes a preferred form, it is to be understood that other forms might be adopted, all coming within the scope of the claim which follows.

What is claimed is as follows:

The process of manufacturing electrical brushes, which consists in molding under heat and pressure finely divided artificial graphite and a binder consisting of a condensation product of phenol and furfural until said binder has been rendered insoluble and infusible, then packing the molded article in charcoal in sealed boxes and sintering at such temperature as to coke substantially all of said binder.

In testimony whereof we hereto affix our signatures.

HARRY M. WILLIAMS.
ALFRED L. BOEGEHOLD.